United States Patent Office 3,262,976
Patented July 26, 1966

3,262,976
CATIONIC HYDROPEROXIDES
William G. Lloyd, Millburn, N.J., and Wendell L. Roe-
lofs, Bloomington, Ind., assignors to The Dow Chemical
Company, Midland, Mich., a corporation of Delaware
No Drawing. Original application Dec. 10, 1962, Ser.
No. 243,656. Divided and this application Apr. 12,
1965, Ser. No. 459,492
2 Claims. (Cl. 260—567.6)

This application is a division of our application Serial No. 243,656, filed December 10, 1962.

This invention relates to new chemical compounds and to a process whereby these compounds are prepared. More particularly, the present invention is concerned with a new class of bifunctional hydroperoxides and new cationic derivatives thereof.

Emulsion polymerization of vinyl monomers conventionally utilizes anionic or cationic emulsifiers or stabilizers and neutral or anionic initiators. Most commonly, anionic soaps and anionic initiators such as persulfates are employed in such polymerization processes. It is known that anionic initiators often do not work in systems using cationic soaps although neutral initiators such as hydroperoxides will work in systems which include either anionic or cationic soaps. It is a principal object of this invention to provide cationic initiators for use in new polymerization systems, thereby to make available new techniques in the art as well as polymers of new and different characteristics.

These novel cationic initiators of polymerization are quaternary ammonium salts and ternary sulfonium salts of halomethylated benzylic hydroperoxides. These salts are represented by one of the formulae

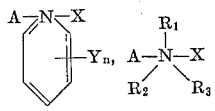

and

wherein X is chlorine, bromine or iodine, Y is lower alkyl such as methyl, ethyl, or butyl, $n$ is 0–5, $R_1$, $R_2$, and $R_3$ are aliphatic radicals of one to about six carbon atoms having at least two hydrogen atoms substituted on the alpha carbon atom such as open chain primary alkyl, for example, methyl, ethyl, isobutyl, or hexyl, and also including alkylene groups wherein $R_2$ and $R_3$ are joined as well as all these groups having inert substituents, such as halo, hydroxy, carboxy, and other neutral or acidic groups, and A is the group

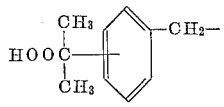

These compounds are the salts formed by the reaction of an ar-(halomethyl)-α,α-dimethyl benzyl hydroperoxide with an appropriate tertiary amine or an aliphatic sulfide. These salts are unusual in that they provide a ready source of cationic free radicals in which the unpaired electron of the peroxide group is substantially separated from the positive charge of the sulfonium or ammonium part of the molecule.

The halomethylated hydroperpoxide starting material is itself useful as a peroxide polymerization initiator apart from its chief utility as intermediate for the salts described above. Preferably, this intermediate is the oxidation product of chloromethylcumene, usually the para-substituted compound. Halomethylcumenes are easily available by halomethylation of cumene, by halogenation of isopropylbenzyl alcohol, or by halogenation of cymene. The oxidation process involves contacting the halomethylcumene with molecular oxygen under conditions similar to those employed for the oxidation of cumene itself to cumene hydroperoxide, that is, in the presence of a free radical initiator such as a peroxide, azobisisobutyronitrile, ultraviolet light, or high energy ionizing radiation, and at a reaction temperature of about 50–150° C. Preferably, the oxidation is run at 70–100° C. At lower temperatures the reaction is undesirably slow while at higher temperatures thermal decomposition of the hydroperoxide product keeps its concentration in the reaction mixture impractically low. Even under preferred conditions, it is difficult to increase the concentration of hydroperoxide much above 5% by weight.

The hydroperoxide product is conveniently separated by extracting the cold reaction mixture with 1–15% by weight alkali metal hydroxide solution. Sodium hydroxide is ordinarily used and the extraction temperature is preferably about 0–15° C. Concentrations of hydroxide solution up to 25% and temperatures up to about 30° C. can be employed but produce lowered yields of hydroperoxide. The alkaline extract is neutralized to about pH 5–6 with a dilute mineral acid, also in the cold, and the neutralized system is extracted with an organic solvent to separate the liberated hydroperoxide. Solvents which are polar Lewis bases having boiling points below 100° C. and being slightly soluble in water are preferred. Methyl ethyl ketone is particularly advantageous. Evaporation of the solvent from the extract leaves as the residue the desired hydroperoxide together with whatever small amounts of water and organic byproducts which were taken up by the extracting solvent.

The extracted hydroperoxide, after evaporation of the solvent, is stirred with the appropriate amine or sulfide in the presence of at least a small amount of a polar solvent. Water is preferred although methanol, ethanol, and solvents of similar polarity may be used. With highly basic nucleophiles such as trialkylamines, the reaction is best carried out at low temperatures, for example, at 0–15° C., to prevent base-catalyzed peroxide decomposition. With less basic reactants, the reaction proceeds satisfactorily at temperatures up to about 50° C. Completion of the reaction in the presence of water is shown by the change from a two-phase system to a homogeneous aqueous solution. Any excess nucleophile can be removed by vacuum evaporation if desired. The aqueous solution may be further purified by adjusting the pH to 5–6 and extracting with a water-immiscible solvent such as toluene to remove small amounts of phenols which may have come through the extraction process with the hydroperoxide.

The purification steps may be omitted from all stages of the process and the cationic hydroperoxide product obtained in low concentrations by reacting the oxidation reaction product with the desired nucleophile.

*Example 1*

A mixture of 200 ml. of p-(chloromethyl)cumene and 1 g. of dibenzoyl peroxide was put in a cylindrical glass flask equipped with a gas inlet tube and a glass percolator assembly. The flask was immersed in a water bath thermostatically controlled at 90–91° C. and oxygen was introduced into the system through the glass inlet tube and the percolator assembly in such a way that the incoming oxygen functioned as a gas lift, expelling the liquid at the top of the percolator through a number of small holes whence the liquid returned to the bottom of the flask in the form of droplets and thin film on the sides of the flask. In this way, maximum exposure of the liquid to oxygen was obtained. After eight hours' oxidation in this fashion at about 0.6 liter per minute gas flow, the p-(chloromethyl)-α,α-dimethylbenzyl hydroperoxide content of the liquid had become more or less stationary at about 4% by weight. The reaction mixture was chilled to 5° C., extracted with cold 10% aqueous sodium hydroxide, and the aqueous extract was neutralized with cold 1 N HCl. The neutral mixture was extracted with several portions of cold methyl ethyl ketone and the combined extracts were evaporated under reduced pressure, thereby producing a two-phase system, the organic phase being essentially p-(chloromethyl)-α,α-dimethylbenzyl hydroperoxide, a nearly colorless, slightly viscous oil.

*Example 2*

A portion of the hydroperoxide product of Example 1 was mixed with a molar excess of trimethylamine and the mixture was stirred overnight at 0–10° C. A small aqueous phase present in the original reaction mixture had disappeared by this time and the product was a homogeneous solution. Excess trimethylamine was removed by evaporation under reduced pressure. The product can be purified further by extraction of the aqueous solution with a water-insoluble solvent such as benzene or toluene to remove small amounts of phenols and similar aromatic impurities. Further evaporation of the aqueous product solution yields the pure p-(1-hydroperoxy - 1 - methylethyl)benzyltrimethylammonium chloride.

*Example 3*

Aqueous p-(chloromethyl)-α,α-dimethylbenzyl hydroperoxide was stirred overnight with pyridine at 20–25° C. An essentially theoretical yield, based on the hydroperoxide used, was obtained of p-(1-hydroperoxy-1-methylethyl)benzylpyridinium chloride, this product having properties similar to the ammonium salt product of Example 2.

*Example 4*

By the method of Example 3, 4-picoline was reacted with p-(chloromethyl)-α,α-dimethylbenzyl hydroperoxide to produce in virtually quantitative yield the quaternary salt, p - (1 - hydroperoxy-1-methylethyl)benzyl-4-picolinium chloride.

*Example 5*

Aqueous p-(chloromethyl)-α,α-dimethylbenzyl hydroperoxide and dimethyl sulfide were stirred together at 20–25° C. in the presence of an emulsifier (dialkyldimethylammonium chloride was used) for 4 days, whereupon essentially complete reaction was obtained. The product was p-(1-hydroperoxide-1-methylethyl)benzyldimethylsulfonium chloride. In the absence of emulsifier, this reaction required about two weeks for completion.

By following the general procedure of Examples 2–5, the hydroperoxide product of Example 1 is reacted with other nitrogenous bases capable of forming quaternary ammonium salts, for example, triethylamine, triethanolamine, N,N-dimethylglycine, vinylpyridine, quinoline, lutidine, 1-methylpiperidine, 1,4-dimethylpiperazine, and diethylaminoethanol or with aliphatic sulfides which form sulfonium salts such as diethyl sulfide, butyl vinyl sulfide, thiodiethanol, methyl (methylthio)acetate, and the like to obtain the corresponding hydroperoxy quaternary ammonium salts and the hydroperoxy sulfonium salts respectively. Similarly, instead of the chlorine-containing hydroperoxide reactant, the analogous bromo and iodo hydroperoxides react with amines and sulfides such as described to give the corresponding quaternary ammonium and ternary sulfonium bromides and iodides.

The sequence of reaction steps can be reversed for the preparation of hydroperoxy sulfonium salts and hydroperoxy ammonium salts made with weakly basic tertiary amines such as pyridine and its homologs. In this alternate method of synthesis, the halomethylcumene is first reacted with a suitable nucleophile as specified to form the onium salt and this reaction mixture is then oxidized according to the procedure as previously described. An attractive feature of this route is that the salt formation and oxidation can be carried out essentially as one reaction step without isolation of intermediate products. A disadvantage is the fact that the hydroperoxide produced cannot be separated by any practical means from the unperoxidized salt. This does not prevent its use in emulsion polymerization systems, however, as shown in Example 6.

*Example 6*

A mixture of 100 ml. each of pyridine and p-(chloromethyl)cumene was put in a 2 l. flask together with 1 g. of dibenzoyl peroxide. The excess of pyridine reduced the viscosity of the quaternary salt and acted as a catalyst for the autoxidation reaction. After the reaction mixture had been contacted with oxygen for 20 hours at 101° C. (±0.2°), the hydroperoxy compound was present in 8.4% by weight. Excess pyridine was evaporated under reduced pressure, leaving a solid mixture of p-isopropylbenzylpyridinium chloride and p-(1-hydroperoxy-1-methylethyl)benzylpyridinium chloride.

By substituting alkylated pyridines such as picoline, lutidine, or collidine for the pyridine used in the above example, the corresponding alkylated pyridinium hydroperoxides are formed. Similarly, aliphatic sulfides as previously defined may be used in place of pyridine to make the sulfonium hydroperoxides.

These cationic hydroperoxides are useful initiators of vinyl polymerizations when used either as relatively pure materials or as obtained in low concentration by reaction of a nucleophile with the original oxidation reaction product, omitting the purification steps. Preferably, however, hydroperoxide of 50–100% purity is employed.

*Example 7*

To a mixture of 80 g. of styrene, 160 g. of water, and 5 g. of lauryl ethoxylate benzyldimethylammonium chloride, a cationic emulsifier, there was added 0.4 g. of p - (1-hydroperoxy-1-methylethyl)benzylpyridinium chloride and the mixture was shaken for 16 hours at 30° C. A polystyrene latex was thereby found to have been formed to the extent of 90% monomer conversion.

An advantageous characteristic of the cationic hydroperoxides of this invention when used as emulsion polymerization initiators is the production thereby of latexes of superior quality, particularly in that less of the wasteful and undesirable polymer agglomerates known as "button" and "skin" are formed.

*Example 8*

Polymerization bottles were loaded with mixtures of 80 g. of styrene, 160 g. of water, 5 g. of lauryl ethoxylate benzyldimethylammonium chloride, 0.6 ml. of 20% sodium formaldehyde hydrosulfite solution, and a hydroperoxide polymerization initiator as specified below. The sealed bottles were tumbled in a water bath at 30° C. for 15–16 hours. The results obtained are summarized below.

| Run No. | Initiator | | Button and Skin, grams (wet) |
|---|---|---|---|
| | g. | Compound | |
| 1 | 0.32 | Cumene hydroperoxide | 40 |
| 2 | [1] 0.19 | p-(1-hydroperoxy-1-methylethyl)benzylpyridinium chloride. | 5 |
| 3 | [1] 0.38 | _____do_____ | 5 |

[1] 2.4 g. and 4.8 g. respectively of an unpurified reaction mixture containing 8% active hydroperoxide were used. In each of the three above runs, approximately 90% of the monomer was polymerized.

Polymerizations were run as shown in Examples 7 and 8 using p-(1-hydroperoxy-1-methylethyl)benzyltrimethylammonium chloride and p-(1-hydroperoxy - 1 - methylethyl)benzyldimethylsulfonium chloride as initiators. The results obtained were comparable to those shown in the examples above. Similar results are obtained with other quaternary ammonium halide salts and ternary sulfonium halide salts of this invention as previously defined.

We claim:
1. A compound of the formula

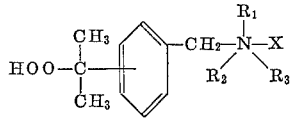

wherein X is chlorine, bromine, or iodine, $R_1$, $R_2$ and $R_3$ when taken separately are primary alkyl of 1–6 carbon atoms, hydroxyalkyl of 1–6 carbon atoms having two hydrogen atoms attached to the alpha carbon atom, or carboxyalkyl of 1–6 carbon atoms having two hydrogen atoms attached to the alpha carbon atom, and $R_2$ and $R_3$ when taken together with the nitrogen atom constitute piperidine or piperazine.

2. p - (1 - hydroperoxy-1-methylethyl)benzyltrimethylammonium chloride.

No references cited.

CHARLES B. PARKER, *Primary Examiner.*

JOSEPH P. BRUST, *Examiner.*

ROBERT V. HINES, *Assistant Examiner.*